United States Patent [19]

Suzuki et al.

[11] Patent Number: 4,868,592
[45] Date of Patent: Sep. 19, 1989

[54] AUTOMATIC FOCUSING DEVICE

[75] Inventors: Noboru Suzuki; Shigeo Tohji, both of Tokyo, Japan

[73] Assignee: Asahi Kogaku Kogyo Kabushiki Kaisha, Tokyo, Japan

[21] Appl. No.: 143,900

[22] Filed: Jan. 11, 1988

[30] Foreign Application Priority Data

Jan. 9, 1987 [JP] Japan .............................. 62-1536[U]
Jan. 10, 1987 [JP] Japan .............................. 62-2048[U]

[51] Int. Cl.⁴ .............................................. G03B 3/00
[52] U.S. Cl. .................................... 354/400; 354/402; 354/286
[58] Field of Search ......................... 354/400, 402, 286

[56] References Cited

U.S. PATENT DOCUMENTS 4,537,487  8/1985  Taniguchi et al. .................. 354/400
4,728,980  3/1988  Nakamura et al. .................. 354/402
4,743,931  5/1988  Matsuzaki et al. .................. 354/402

Primary Examiner—Russell E. Adams
Attorney, Agent, or Firm—Sughrue, Mion, Zinn, Macpeak & Seas

[57] ABSTRACT

Disclosed here is an automatic focusing device high in focusing accuracy, in which an amount of drive for driving a focusing lens to a position focused on an object can be renewed during the focusing lens moving to the focused position.

13 Claims, 12 Drawing Sheets

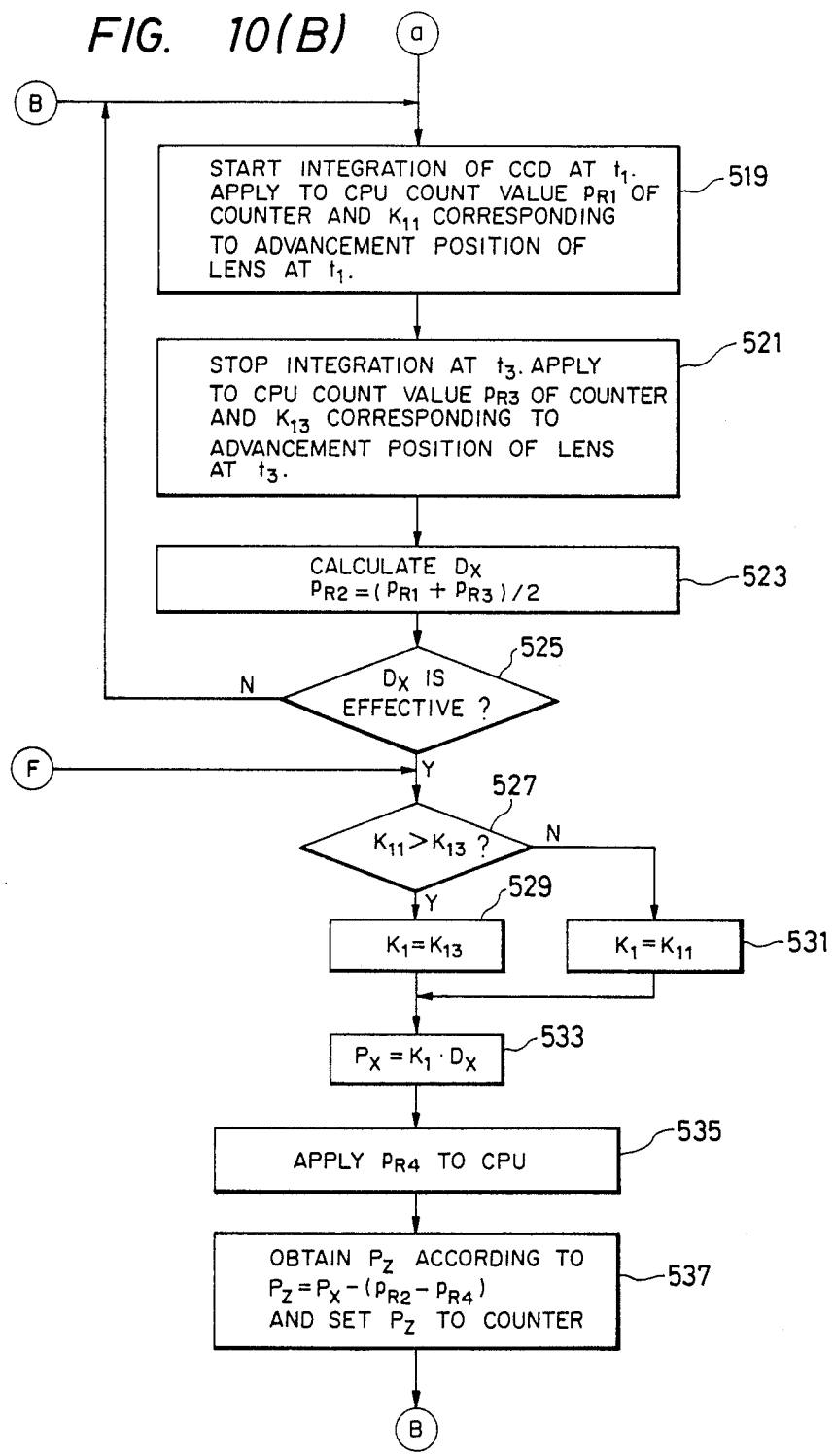

AUTOMATIC FOCUSING DEVICE

BACKGROUND OF THE INVENTION (1) Field of the Invention

This invention relates to an apparatus having an automatic focusing (AF) function such as an AF camera, and more particularly to an automatic focusing device for use in a signal lens reflex camera, which is capable of accurately moving a focusing movable lens to a focused position.

(2) Description of the Prior Art

Recently, there have been available some lens-interchangeable cameras having an AF function.

FIG. 1 is a block diagram outlining the general construction of a interchangeable-lens camera of this type. More specifically, FIG. 1 mainly shows components of the camera which concerns the AF mechanism, not showing components which are generally provided for a camera and a lens.

In FIG. 1, reference numeral 11 designates a camera body; and 31, a photographical lens detachably mounted on the camera body 11. The camera body 11 and the lens 31 are mechanically connected to each other through a clutch 13 on the body side and a clutch 33 on the lens side, and are electrically connected to each other through an electrical contact group 15 on the body side and an electrical contact group 35 on the lens side.

The photographing lens 31 comprises: a lens system 39 including a focusing lens 37 which is movable along the optical axis; a drive force transmitting mechanism 41 for transmitting a drive force from a drive source (described later) to the lens 37 to move the latter 37 to a focusing position; and a lens ROM 43 for storing the aperture data of the photographing lens and the position data of the movable lens 37 and the like.

On the other hand, the camera body 11 comprises: an image pickup section 17 having, for instance, a CCD (charge-coupled device) sensor to receive a part of the light beam passed through the photographing lens 31 thereby to form the image of the object. The camera body 11 further comprises: a control section 19 having a variety of functions such as a function of calculating an amount of defocusing D indicating the amount of deviation from the focusing position and a direction of the deviation in response to the output signals of the image pickup section 17 and a function of determining the direction of movement of the lens for focusing the lens 37 on an object. The camera body 11 further comprises: a drive mechanism 25 including an electric motor 21 for driving the movable lens 37 in the photographing lens 31, and an encoder 23 for controlling the number of revolutions of the motor 21. The drive force of the drive mechanism 25 is transmitted through the clutch mechanism 13 and 33 and the drive force transmitting mechanism 41 to move the movable lens 37.

An amount of drive P moving the movable lens 37 to a focusing position can be determined in term of a number of rotation of the motor 21, that is, it can be set according to the pulse count number of the pulse signal from the encoder 23 which detects the number of revolutions of the motor 21. In the conventional AF camera, the amount of defocus D is calculated by the control section 19, and the pulse count value P corresponding to the amount of defocus D is calculated according to the following equation (1):

$$P = K \cdot D \quad (1)$$

where K is the lens movement conversion coefficient.

The coefficient K is predetermined so as to obtain a pulse count number P allowing the movable lens 37 to move to the position where the lens is positively focused on the object according to the amount of defocus D, and each photographing lens has its own coefficient K. The coefficient K is stored in the lens ROM 43 of the photographing lens. In the case where the photographing lens is a zoom lens, a plurality of coefficients are stored in the lens ROM.

The movable lens 37 is continuously moved until the number of pulses of the output signal from the encoder 23 reaches the pulse count value P calculated according to equation (1).

In the case where it is required to focus the lens on an object with higher accuracy, the lens is driven intermittently; that is, the lens is moved small by small, and every time the lens is moved, a focusing pulse count value is newly obtained.

A method for obtaining an amount of defocus with respect to an object to be photographed will be described hereinafter.

First, the CCD sensor of the image pickup section 17 receives light from the object to provide defocusing data including an amount of defocusing and a direction of defocusing according to the correlation method. However, in the case where the present position of the movable lens is greatly apart from the focusing position for the object, sometimes it is impossible to obtain an amount of defocusing effective in calculation of the amount of drive to the focusing position, that is, sometimes the amount of defocusing cannot be obtained or the amount of defocusing includes an error. In this case, heretofore the following method is employed: The movable lens, after being moved for a distance in one direction at a constant speed, is stopped, and an amount of defocusing is obtained as described above. This operation is repeatedly carried out until the amount of defocusing thus obtained is determined effective. In the case where the lens is moved on in one direction, and no effective amount of defocus is obtained although the lens has reached the end point in the one direction, the lens is moved in the opposite direction, and the above-described series of operations are carried out until the amount of defocusing is determined effective.

However, when the movable lens is moved at a stretch according to the amount of drive of the movable lens obtained according the amount of defocus D, sometimes the resultant focal accuracy of the lens is lower than required.

This difficulty is significant when the amount of defocusing is large. That is, when the lens is greatly defocused from an object, the amount of defocusing obtained is often incorrect, including an error. Therefore, the amount of drive of the lens to the focusing position obtained from the amount of defocusing includes an error, as a result of which the lens is not satisfactorily focused on the object.

FIG. 2 is a graphical representation showing characteristic curves outlining the relation between an amount of defocus D and the number of pulses P counted by the encoder (hereinafter referred to as "a pulse count value P", when applicable) when the image having the amount of defocus is focused, with amounts of defocus D plotted on the horizontal axis and with the pulse count values P corresponding to the amounts of movement of the lens plotted on the vertical axis.

In FIG. 2, reference character I (solid line) designates an actual characteristic curve formed by plotting the numbers of pulses of a signal from the encoder when images having amounts of defocus are focused, respectively; and II (dotted line), a theoretical characteristic curve indicating the above-described expression (1).

As is apparent from FIG. 2, when it is required to determine the amount of movement of the focusing lens to the focusing position, the pulse count value can be accurately determined in the particular region $2d$ where the amount of defocus is small, whereas in the region where the amount of defocus is large, the pulse count value obtained includes a large error.

On the other hand, in the case where the movable lens is moved for a distance and stopped and then an effective amount of defocus is obtained by repeated trial and error, the light receiving operation of the CCD sensor is carried out after the movement of the lens has been accomplished, as a result of which it takes a relatively long period of time to obtain the amount of defocus, and accordingly a relatively long period of time is required for focusing the lens on the object. This is a serious difficulty for the camera, because it is essential for the camera to be able to achieve a photographing operating without missing an instantaneous shutter chance.

SUMMARY OF THE INVENTION

Accordingly an object of this invention is to eliminate the above-described difficulties accompanying a conventional focusing method. More specifically, an object of the invention is to provide a focusing device in which, while the movable lens is being moved towards a focusing potion, the amount of movement of the lens to the focusing position is continuously obtained, and the lens is accurately focused on the object according to the amount of movement thus obtained.

In order to achieve the foregoing object of the invention, the inventor has made an intensive experiment on the focusing device. Through the experiment it has been found that even if, in the case where, as was described above, an amount of defocus is obtained by repeated trial and error with the current position of the movable lens greatly shifted from the focusing position for the object, the CCD sensor is caused to receive light while the movable lens is being moved so that the amount of defocus is calculated from the data provided by the CCD sensor when the lens is stopped, then the amount of defocus thus calculated is effective when the movable lens is moved towards the focusing position. Furthermore, if even, in the case where the movable lens is moved away from the focusing position, upon detection of the end point in that direction while the CCD is caused to receive light, then an effective amount of defocus can be obtained. In addition, it has been found that the luminance of the object is one of the essential factors for the focusing operation. That is, it is necessary to select the speed of movement of the lens according to the luminance of the object so that the CCD sensor can obtain the quantity of light necessary for itself before the amount of movement of the lens reaches a large value (or before the lens passes through the focusing position).

The foregoing object of the invention has been achieved by the provision of a focusing device which, according to the invention, comprises: a focusing movable lens; a drive mechanism for moving said focusing movable lens at a constant speed, means for calculating an amount defocus for an object; means for utilizing the amount of defocus to obtain an amount of drive to move the lens to a focusing position for the drive mechanism; means for utilizing the amount of drive to obtain an amount of defocus and a new amount of drive while said lens is being moved at the constant speed; and means for subtracting from the new amount of drive an amount of drive of the lens which has occurred for a period of time required for obtaining said new amount of drive.

BRIEF DESCRIPTION OF THE INVENTION

In the accompanying drawings, FIG. 1 is a schematic diagram illustrating the general construction of an interchangeable-lens camera; FIG. 2 is a graphical representation showing characteristic curves outlining the relation between an amount of defocusing D and the number of pulses P of a signal from an encoder; FIG. 3 is an explanatory diagram for a description as to the principle of focusing operation in an automatic focusing device according to the present invention; FIG. 4 is a block diagram showing the arrangement of an example of a single lens reflex camera having an automatic focusing device according to the present invention; FIG. 5 is schematic diagram illustrating a distance code plate; FIG. 6 is a block diagram for a description of the functions of a PCU 93 and CPU 101; FIG. 7 is a flow chart showing a first embodiment of the operation of the focusing device according to the present invention, FIGS. 8(A) to 8(C) are schematic diagrams showing a method for determining whether an amount of defocusing is effective or not; FIG. 9 is a block diagram showing an example of a device for driving the movable lens according to amount of drive P; FIGS. 10(A) to 10(G) are flow charts showing a second embodiment of the operation of the focusing device according to the present invention; FIG. 11 is an explanatory diagram for a description as to the principle of obtaining the new amount of drive $P_z$; and FIG. 12 is a flow chart showing a third embodiment of the operation of the focusing device according to the present invention.

DESCRIPTION OF PREFERRED EMBODIMENTS

The focusing device of the invention is constructed as described above. Therefore, even if the movement of the movable lens is started with the amount of drive obtained from an amount of defocus including an error, while the movable lens is being moved towards the focusing position an accurate amount of drive to move the lens to the focusing position can be obtained at a position close to the focusing position for the drive mechanism.

Figure 3:
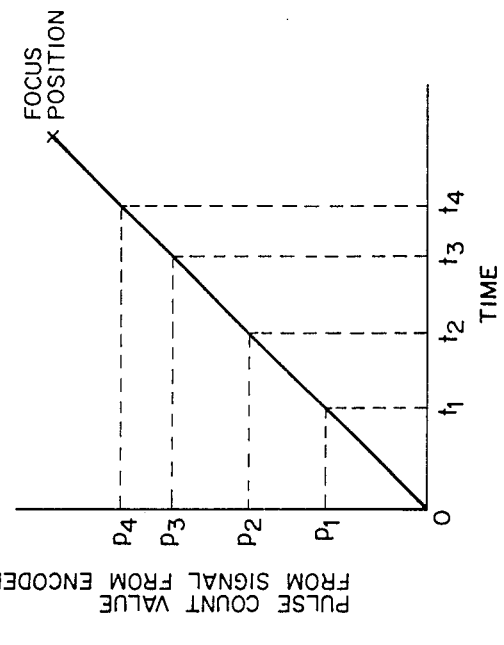
Figure 2:
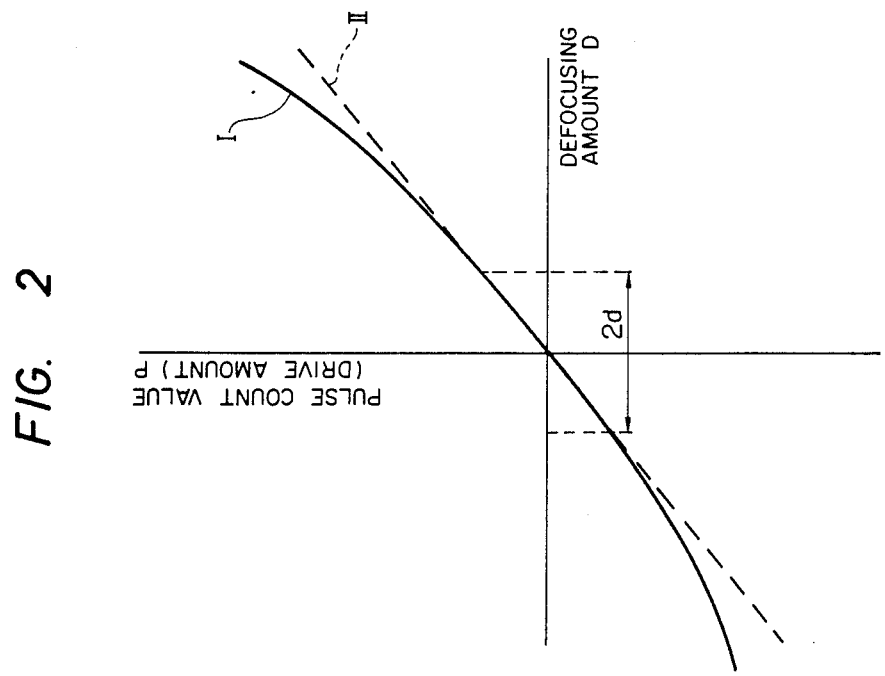

The function of the focusing device of the invention will be concretely described with reference to FIG. 3. FIG. 3 is an explanatory diagram outlining the principle of focusing operation in the focusing device of the invention.

A camera being a automatic focusing function (AF) which essentially comprises: a drive mechanism including a motor and an encoder for moving the movable lens to a focusing position; and an image pickup section for forming the image of an object to obtain data for determining whether the lens is focused on the object or not.

The initial amount of defocusing $D_0$ of an object is first obtained, and then the amount of drive for the motor which provides an amount of movement of the lens necessary for eliminating the amount of defocusing $D_0$ is obtained. As described before, the amount of drive is obtained as the number of pulses of an output signal from by the encoder. Now, it is assumed that the number of pulses corresponding to the value $D_0$ can be expressed as $P_0 = KD_0$ where the K is the lens movement conversion coefficient. When the motor is driven with the number of pulses $P_0$ as a target value, the movable lens moves towards the focusing position at a constant speed as long as the motor is rotated at a constant speed.

According to the present invention, while the movable lens moves at a constant speed, the amount of defocusing is renewed. More specifically, at a time instant $t_1$ during the the constant speed movement of the movable lens, the image of an object is formed by the image pickup section. The image pickup section should receive more than a predetermined quantity of light from the object to form the image, and therefore it is necessary for the image pickup section to receive the light for instance until the time instant $t_3$. On the other hand, for the period of time $(t_3 - t_1)$, the movable lens is continuously kept moved, while the the total number of pulses of the pulse signal from the encoder from the start of rotation of the motor is increased to $p_3$ from $p_1$.

Now, an amount Of defocusing $D_x$ is obtained according to the data provided by the image pickup section for the period of time $(t_3 - t_1)$. The amount of defocusing $D_x$ thus obtained can be regarded as that at the middle of the period of time $(t_3 - t_1)$; i.e., at the time instant $t_2$. The total pulse count value $p_2$ at the time instant $t_2$ is expressed by $(P_1 + p_3)/2$ because the motor is rotated at the constant speed. In succession, a new amount of drive for the motor i.e., a new pulse count value $P_x$ which provides an amount of movement of the lens necessary for eliminating out the amount of defocusing $D_x$ is obtained according to $P_x = KD_x$.

In this case, it should be noted that during the values $D_x$, $p_2$ and $P_x$ are being calculated, the movable lens moves continuously. Therefore, at the time instant $t_4$ when the value $P_x$ has been calculated, the total pulse count value is increased to $p_4$.

In view of the foregoing, in order that the pulse count value $P_z$ which permits the movable lens to move from its position at the time instant $t_4$ to the focusing position is obtained according to the amount of defocusing $D_x$ obtained at the time instant $t_2$, the following equation (2) should be calculated:

$$P_z = P_x - (p_4 - p_2) \qquad (2)$$

After the time instant $t_4$, the motor is driven with the value $P_z$ as a target value, as a result of which the initial amount of drive $P_0$ is corrected, and the lens can be focused on the object with high accuracy. If the above-described series of operations are carried out cyclically if necessary, then the lens can be focused on the object more accurately.

One preferred embodiment of this invention will be described with reference to the accompanying drawings. These drawings are simplified to the extent that the invention can be merely understood. It goes without saying that the dimensions, configurations and arrangement of the components of the embodiment are not limited to those shown in the drawings. In the drawings, like parts are designated by like reference numerals or characters.

Figure 1:
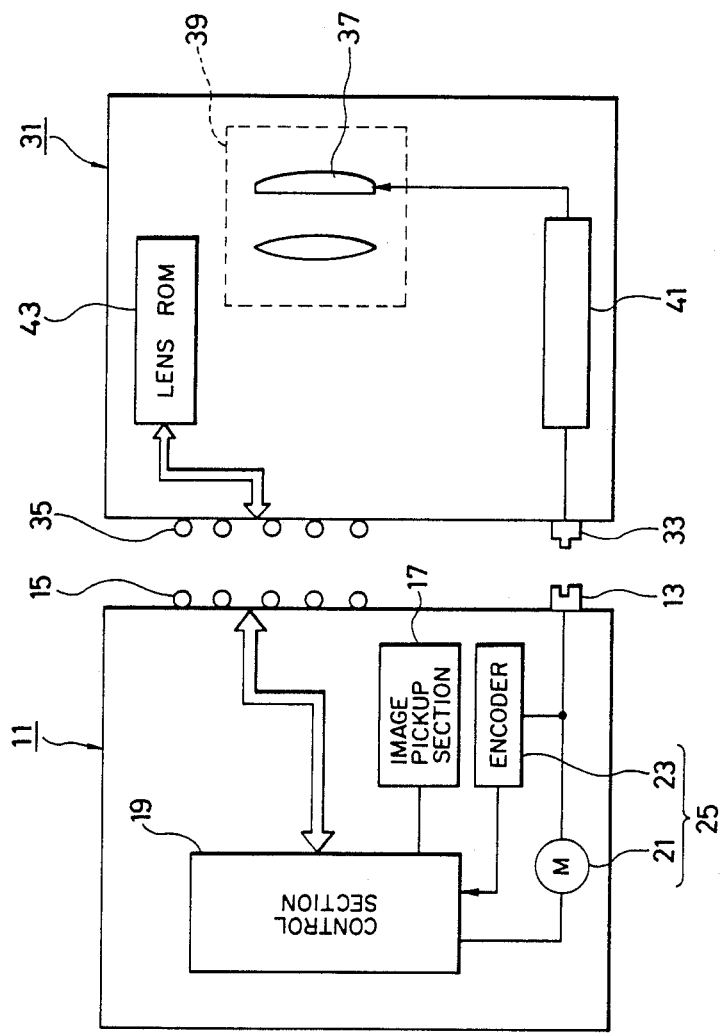

As was described with reference to FIG. 1, in order to obtain based on an amount of defocusing D, a pulse count value P of a signal output by an encoder, which is required to move the movable lens of the photographing lens to a focused position, it is necessary to determine a pulse count value P according to an amount of movement of the lens which can eliminate the amount of defocusing D to thereby obtain an approximate expression indicating the relation between the values D and P accurately the amount of drive for the movable lens, i.e., the pulse count value P is expressed by the following equation (3):

$$P = \sum_{i=1}^{n} Ki \cdot D^i \qquad (3)$$

In an embodiment described herein after, an example of the approximate expression is as follows.

$$P = K \cdot D \qquad (1)$$

where $n = 1$.

However, it should be noted that the approximate
expression is not limited to equation (1) only; that is, it may be the following equation (4) including the second term:

$$P = K_1 D + K_2 D_2 \qquad (4)$$

where $K_1$ and $K_2$ are the coefficients determined for each photographing lens so as to obtain a pulse count value P an output signal from an encoder, which allows the movable lens to move to a position where the lens is positively focused on an object according to an amount of defocusing D.

Figure 4:
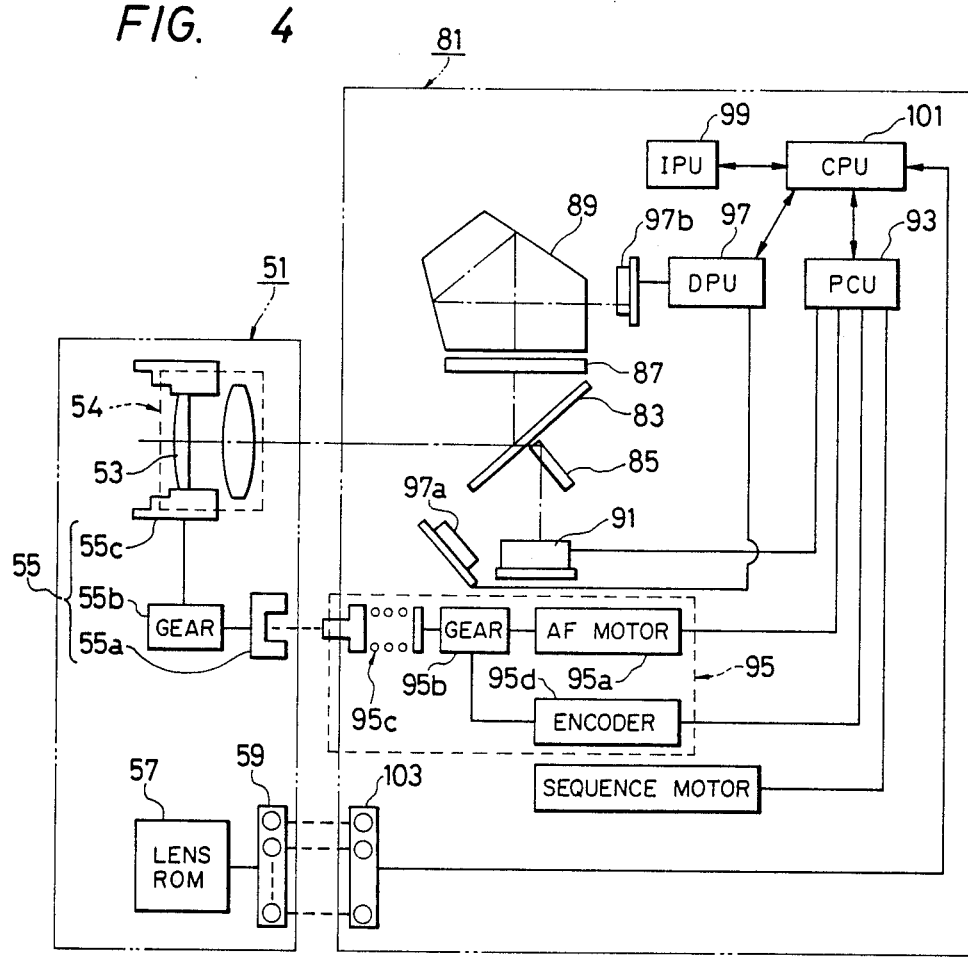

FIG. 4 is a block diagram outlining the arrangement of one example of a camera with an automatic focusing device according to the present invention. Descriptions of components which are generally provided for a camera and a lens and are not necessary for a description of the invention are omitted intentionally.

In FIG. 4, reference numeral 51 designates a photographing lens; and 81, a camera body on which the photographing lens 51 is mounted.

The photographing lens 51 comprises: a lens system 54 including a focusing lens 53 which is movable along an optical axis; a drive force transmitting mechanism 55 including a clutch 55a, a gear 55b and a helicoid gear 55c for transmitting a drive force from a drive source (described later) in the camera body 81 to move the movable lens 53 to a focused position; a lens ROM 57 for storing the aperture data of the photographing lens 51, the advancement position data of the movable lens 53 and the like; and an electrical contact group 59 on the lens side for electrically connecting the photographing lens 51 to the camera body 81.

Figure 5:
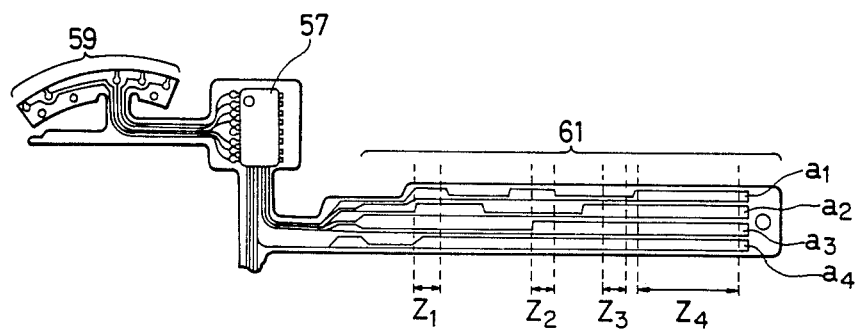

The photographing lens 51 further includes a distance indicating ring ganged with the movement of the movable lens 53, a brush member secured to the distance indicating ring, which is moved according to the rotation of the distance indicating ring, and a distance code plate with which the brush member contacts slidably. FIG. 5 is a schematic diagram illustrating the construction of the distance plate. In FIG. 5, reference numeral 61 designates the distance indicating plate. The lens ROM 57 and the electrical contact group 59 are provided as shown in FIG. 5. The function of the distance code plate 61 will be described later in detail.

On the other hand, the camera body 81 comprises: an optical system including a main mirror 83, an auxiliary mirror 85, a focusing screen 87 and a pentagonal prism 89. The camera body 81 further comprises: an image pickup section 91 for receiving a part of the light beam passed through the photographing lens 51 to form the image of the object. The image pickup section 91 may be designed so as to meet a kind of a focusing position detecting system. In the embodiment, the image pickup section 91 comprises an optical system including a separator lens according to a correlation method (phase difference system) and a CCD (charge-coupled device) having two image pickup regions. The camera body 81 further comprises an automatic focusing (AF) control section (PCU) 93 capable of controlling the image pickup section and a drive mechanism (described later) for driving the movable lens 53 and the drive mechanism 95 having, for instance, an automatic focusing (AF) motor 95a, a gear 95b, a clutch 95c and an encoder 95d for controlling the number of revolutions of the motor 95a, to drive the movable lens 53 in the photographing lens 51. The drive force of the drive mechanism 95 is transmitted through the clutch 95c on the body side and the clutch 55a on the lens side to the movable lens 53 to move the lens 53 along the optical axis. By rotating the motor 95a at a constant speed, the movable lens can be moved at a constant speed.

The camera body 81 further comprises: light receiving elements 97a and 97b, an AE (automatic exposure) control section (DPU) 97 for automatic exposure control; a display control section (IPU) 99 for controlling a display operation; a central control unit (CPU) 101 for controlling the above-described control section 93, 97 and 99; and an electrical contact group 103 on the body side which is coupled to the electrical contact group 59 on the lens side. The CPU 101 also controls the lens ROM 57 of the photographing lens 51.

Figure 6:
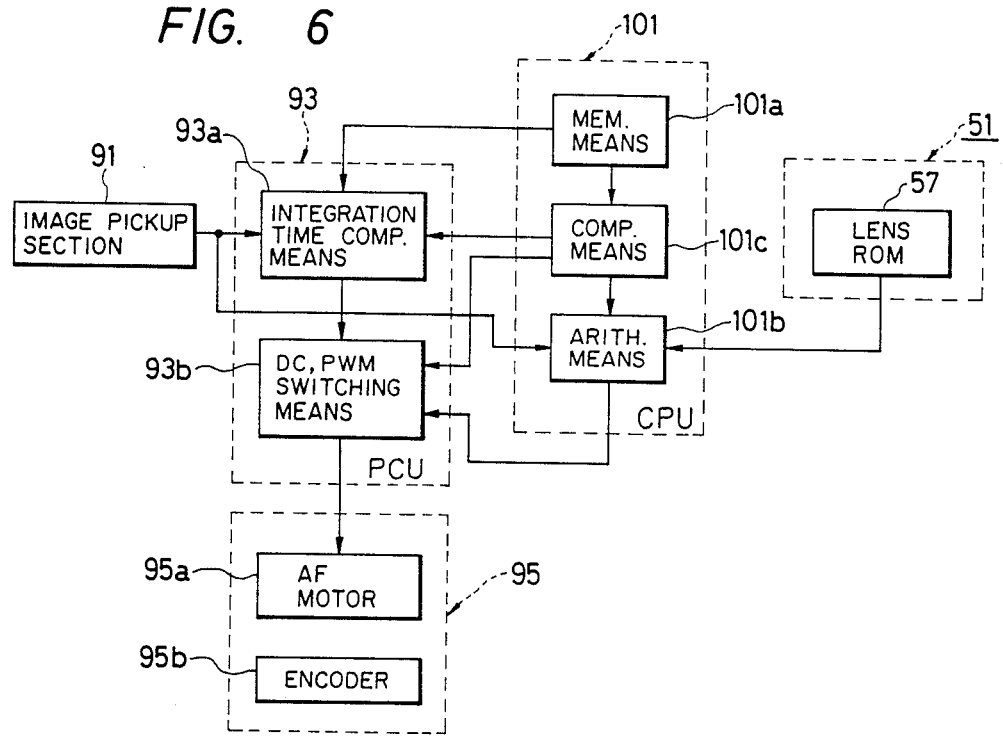

In this embodiment, the PCU 93 and the CPU 101 can be designed as follows: FIG. 6 is a block diagram for a description of the functions of the PCU 93 and the CPU 101.

The PCU 93 comprises an integration time comparison means 93a of the CCD of the image pickup section 91 and switching means 93b for selecting a DC (direct current) control mode for driving the AF motor 95a at a constant speed or a PWM (pulse with modulation) control mode for driving the motor precisely, according to the given pulse count value P.

The CPU 101 comprises a memory means 101a for storing a CCD's reference integration time, a reference pulse count value for causing the switching means 93b to select the DC control mode or the PWM control mode, a reference value for determining whether or not an amount of defocusing is effective, and a reference value for determining whether or not the lens is focused on an object (hereinafter referred to as "a focus determination reference value", when applicable); an arithmetic means 101b for calculating an amount of defocusing D and a pulse count value P; and a comparison means 101c for comparing an amount of defocusing D with the reference value stored in the memory means 101a.

In the camera thus constructed, the means concerning the focusing device of the invention can be formed as follows:

The image pickup section 91, the PCU 93 and the CPU 101 act as means for obtaining an amount of defocusing D for an object.

The coefficient K of the equation (1) (in the case of equation (4), the coefficients $K_1$ and $K_2$) which is determined for each of the photographing lens, is stored in the lens ROM 57 of the photographing lens 51.

It should be noted that the determination of the coefficients $K_1$ and $K_2$ should be carried out depending on a sort of photographing lens. Because, there is a possibility that in order to improve the accuracy in focusing, it may be better to renew the coefficients in accordance with the advancement position of the movable lens. The renewing of the coefficients can be carried out by storing a number of coefficients for the lens advancement positions in the lens ROM 57 in advance, and reading out the suitable coefficient stored in the address assigned by the code designated by the code plate 61, which varies according to the lens advancement position.

The CPU 101 acts as means for reading the coefficient K out of the lens ROM 57 and for using the coefficient K thus read and the amount of defocusing D to obtain according to equation (1) the amount of drive for the movable lens 53 to the focused position.

The PCU 93 and the CPU 101 act as means for obtaining, while the movable lens 53 is being moved at a constant speed, the amount of defocusing of the lens at a position and the amount of drive of the lens from that position to the focused position.

The CPU 101 acts as means for subtracting from the amount of drive of the lens 53 obtained while the lens 53 is being moved the amount of drive thereof which is required for the calculation of the firstly mentioned amount of drive.

Figure 7:
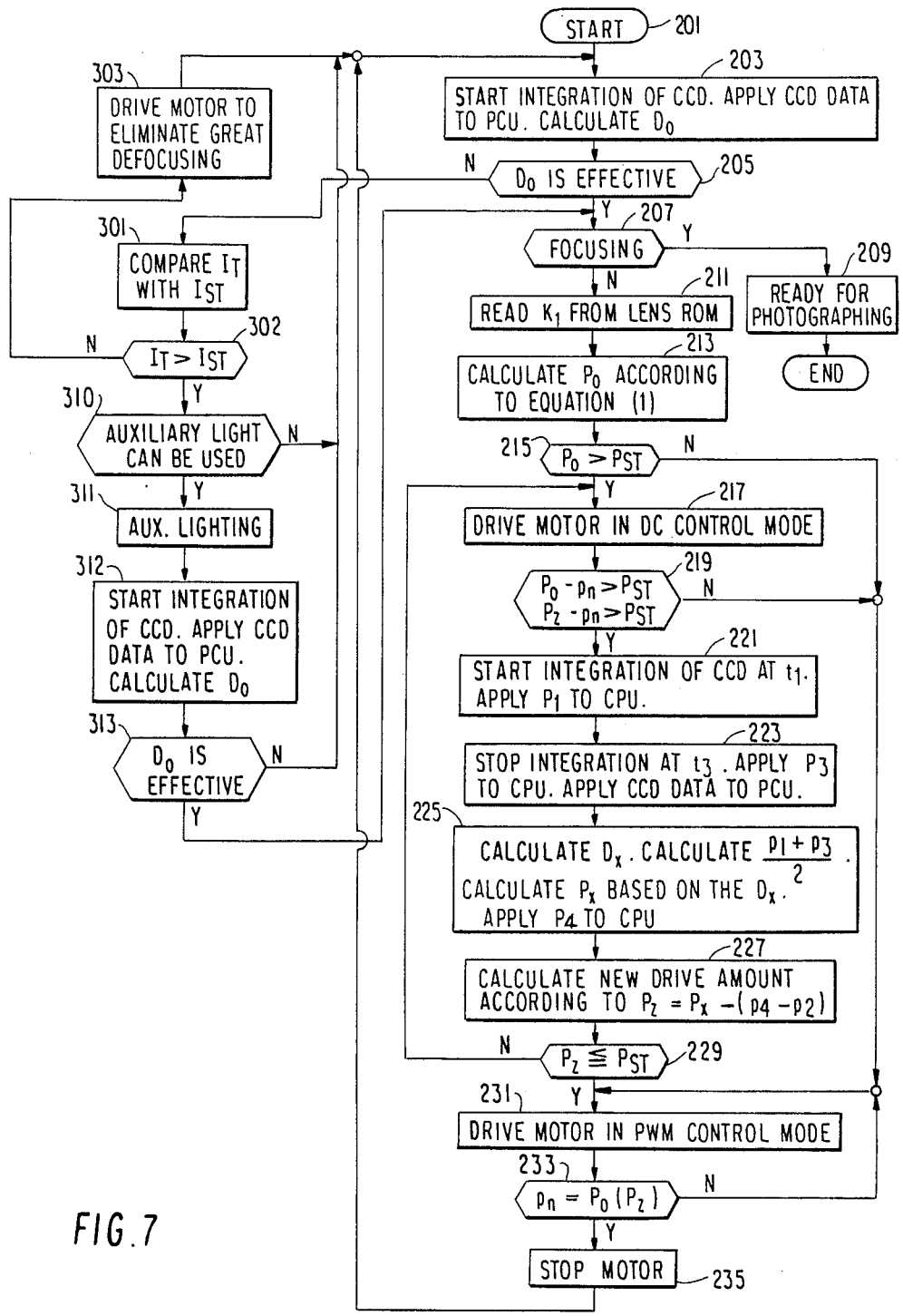

The operation of the focusing device according to the invention will be described with reference to FIGS. 6 and 7. FIG. 7 is a flow chart showing the operation of the focusing device where the coefficient $K_1$ is made unchanged regardless of the advancement amount of the movable lens.

A photographing operation in an automatic focusing mode is manually or automatically selected (Step 201).

In the image pickup section 91, a part of the light beam passes through the photographing lens 51 (cf. FIG. 1) is subjected to integration operation. The data (output signal) of the CCD is applied to the integration time comparison means 93a in the PCU 93 and to the arithmetic means 101b in the CPU 101. The arithmetic means 101b calculates an initial amount of defocusing $D_0$ (Step 203). If the amount $D_0$ is large, then the number of motor drive pulses corresponding to the amount of drive of the lens to the focused position may be often incorrect. In the embodiment, the amount of defocusing is obtained according to the correlation method (phase difference system). The method is based on the fact that the distance between the images formed respectively on a reference CCD and a comparison CCD in the image pickup section 91 is substantially proportional to the amount of defocusing; however, the detailed description of the method will be omitted, because the method is well known in the art.

Next, it is determined whether or not the amount of defocusing $D_0$ obtained in the step 203 is effective as a value for determining the number of motor drive pulses (hereinafter referred to as "a motor drive pulse number", when applicable) $P_0$ (Step 205). One example of this determination method will be described with reference to FIGS. 8(A), 8(B) and 8(C).

Figure 8A:
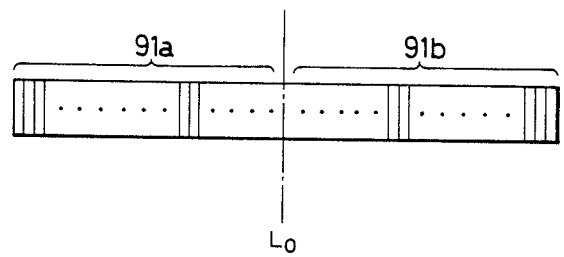
Figure 8B:
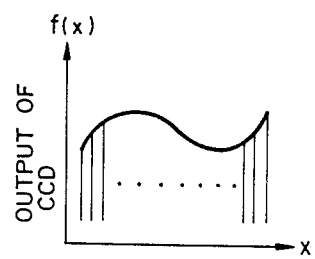
Figure 8C:
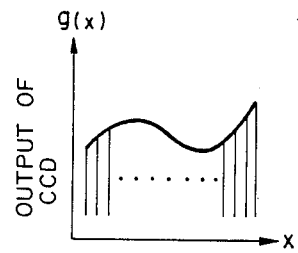

In FIG. 8(A), reference numerals 91a and 91b designates the reference CCD and the comparison CCD of the image pickup section 91, respectively. A light beam from an object is applied to both the CCDs 91a and 91b; that is, the image of the object is formed on the CCDs 91a and 91b so that the CCDs provide output signals. FIGS. 8(B) and 8(C) are characteristic diagrams showing the output signals of the CCDs 91a and 91b, respectively.

As described before, the output signals of the CCDs are applied to the arithmetic means 101b in the CPU 101. The arithmetic means 101b uses the output signals to calculate a contrast $y_1$ from the following equation (a):

$$y_1 = \int |(d/dx)f(x)| dx \qquad (a)$$

In addition, a correlation calculation is carried out according to the following equation (b):

$$y_2 = \int |f(x) - g(x-t)| dt \qquad (b)$$

where t is the amount of lateral shift on the CCD sensor.

Next, the comparison means 101c of the CPU 101 compares the contrast $y_1$ thus obtained with a reference value $C_1$ stored in the memory means 101a of the CPU 101. Furthermore, the minimum value $y_2(t_{min})$ of the correlation calculation $y_2$ is compared with a reference value $C_2$ stored in the memory means 101a of the CPU 101. Moreover, the absolute value of the differential value $dy_2/dx$ of the value $y_2$ at the focusing point which is obtained according to the equation (b), is compared with a reference value stored in the memory means 101a of the CPU 101. When the results of these comparison satisfy the following expressions (1), (2) and (3), it is determined that the amount of defocusing D in question is effective:

$$Y_1 > C_1 \qquad (1)$$

$$Y_2(t_{min}) < C_2 \qquad (2)$$

$$|dy_2/dx| > C_3 \qquad (3)$$

In the case where the amount of defocusing $D_0$ is effective, it is determined whether or not the lens is focused on the object (Step 207). This determination is carried out by the arithmetic means 101b and the comparison means 101c of the CPU 101 for instance in the following manner: Assuming that the amount of lateral shift t when focusing is obtained is expressed as $t_0$, when a value of $|t_{min} - t_0|$ where $t_{min}$ is the value obtained according to the above-described equation (b), is smaller than a reference value $t_s$ stored in the memory means 101a, it is determined that the lens is focused on the object. When it is determined that the lens is focused on the object, the photographing preparatory operation is ended (Step 209).

In the case when the amount of defocusing $D_0$ is effective but the lens is not focused on the object yet, the movable lens 53 (FIG. 4) is moved to the focusing position.

The coefficient K is inputted from the lens ROM 57 of the photographing lens 51 into the arithmetic means of the CPU 101 (Step 211). In case of using the equation (4), the coefficients $K_1$ and $K_2$ are inputted from the lens ROM 57 of the photographing lens 51 into the arithmetic means of the CPU 101.

The coefficient K and the amount of defocusing $D_0$ are used to obtain the pulse count value $P_0$ of the signal from the encoder, which corresponds to the amount of drive of the movable lens to the focusing position, according to the equation (1) (in case of reading both $K_1$ and $K_2$, according to the equation (4)) (Step 213).

Thereafter, while the AF motor 95a rotates in the correct direction, the pulse count value $p_n$ of the signal from the encoder 95b is calculated.

During the AF motor 95a being driven, the drive force of the motor 95a is transmitted through the clutch 95c on the body side and the clutch 55a on the lens side to the movable lens 53 to move the latter 53 to the focused position.

In this embodiment, the drive method of the AF motor 95a is changed in response to the amount of defocusing D as follows: First, in the comparison means 101c, the pulse count value $P_0$ obtained from the equation (1) is compared with a reference pulse count value $P_{ST}$ stored in the memory means 101a of the CPU 101 in advance (Step 215), and the result of comparison is applied to the switching means 93b of the PCU 93. When $P_0 > P_{ST}$, the switching means 93b selects the DC control mode so that the AF motor 95a rotates at a constant high speed (Step 217). Even in the motor driving operation in the DC control mode, the total pulse count value $p_n$ of the signal from the encoder 95d is detected. When the difference $(P_0 - p_n)$ between the initial drive pulse count value $P_0$ and the total pulse count value $p_n$ from the start of rotation is equal to or smaller than $P_{ST}\{(P_0 - P_n) \leq P_{ST}\}$, the AF motor is pulse-driven in the PWM control mode (Steps 219 and 231). Due to this control method, when the amount of defocusing D is large, the lens can be moved quickly; whereas when the amount of defocusing D is small, the lens can be moved delicately. Thus, the automatic focusing operation is excellent both in accuracy and in efficiency.

While the AF motor 95a is driven in the DC control mode, the movable lens 53 moves towards the focusing position at a constant speed. During the constant-speed movement of the movable lens 53, a process for obtaining a new amount of drive $P_z$ for the motor 95a to move the lens 53 to the focused position is continuously carried out (Steps 221 through 229).

First, at a time instant $t_1$ during the constant-speed movement of the movable lens 53, the integration operation of the CCD sensor of the image pickup section 91 is started. The total pulse count value $p_1$ of the signal from the encoder for the period of time from the start of the motor rotation to the time instant $t_1$ is applied to the memory means 101a of the CPU 101 (Step 221). At a time instant $t_3$ after the lapse of a period of time long enough to allow the CCD sensor to receive a predetermined quantity of light, the integration operation of the CCD sensor is suspended For the period of time $(t_3 - t_1)$, the movable lens is being moved, and therefore the total pulse count value of the signal from the encoder 95d is increased to $p_3$ from $p_1$. The value $p_3$ at the time instant $t_3$ is inputted to the memory means 101a of the CPU 101. In addition, the data provided by the CCD sensor for the period of time $(t_3 - t_1)$ is applied to the PCU 93 (Step 223).

Similarly as in the calculation of the amount of defocusing in the Step 203, an amount of defocusing $D_x$ is calculated according to the data provided by the image pickup section 91 for the period of time $(t_3-t_1)$. The value $D_x$ thus calculated represents an amount of defocusing at the middle of the period of time $(t_3-t_1)$; i.e., at a time instant $t_2$. The total pulse count value $p_2$ at the time instant $t_2$ is calculated from the following equation (5) (step 225):

$$p_2=(p_1+p_3)/2 \qquad (5)$$

In the arithmetic means 101b, the value $D_x$ is used to obtain the number of pulses $P_x$ to move the lens 53 from its position at the time instant $t_2$ to the focused position according to equation (1) described above (Step 225).

On the other hand, the movable lens moves continuously even while the values $D_x$, $p_2$ and $P_x$ is being calculated. Therefore, at the time instant $t_4$ when the value $P_x$ has been calculated, the total pulse count value of the signal from the encoder has been increased to $p_4$ from $p_3$. The value $p_4$ is written to the memory means 101a (Step 225).

Thereafter, according to the amount of defocusing $D_x$ obtained at the time instant $t_2$, the arithmetic means obtain the number of pulses $P_z$ required for moving the movable lens from its position at the time instant $t_4$ to the focused position according to the following equation (5) (step 227):

$$P_z=P_x-(p_4-p_2) \qquad (2)$$

That is, the amount of defocusing obtained at a position closer to the focused position can be utilized to obtain a new amount of drive $P_z$.

In the Step 229, the value $P_z$ is compared with the reference pulse count value $P_{ST}$, so that one of the DC control mode or the PWM control mode is selected to drive the motor 95a according to the value $P_z$. When $P_z > P_{ST}$, the switching means 93 selects the DC control mode, and the Steps 217 through 229 are effected. When $P_z \leq P_{ST}$, the motor 95a is driven in the PWM control mode (Step 231).

At the time instant $t_4$, the total pulse count value of the signal from the encoder 95d is reset. When the number of pulses $p_n$ counted thereafter becomes equal to the value $P_z$ calculated, the motor 95a is stopped (Steps 233 and 235).

After the time instant $t_4$, the motor is driven with the value $P_z$ as a target value so that the initial amount of drive $P_0$ is corrected. Therefore, the lens is focused on the object with higher accuracy. If the above-described series of operation are cyclically carried out if necessary, then the lens can be focused on the object more accurately.

Let us consider the case where, in Step 205, the amount of defocusing $D_0$ is determined ineffective. This may occur when an object having substantially no contrast is photographed or the amount of defocusing $D_0$ is considerably large (the image being greatly foggy).

In this case, in the comparison means 101c, the integration time $I_T$ of the CCD sensor is compared with a reference integration time $I_{ST}$ stored in the memory means 101a (Step 301). When $I_T \leq I_{ST}$ and the amount of defocusing is ineffective although data is supplied to the CCD sensor, it is determined that the lens is greatly defocused, so and the AF motor 95 is driven to change the position of the movable lens 53 (Steps 302 and 303). In this operation, the direction of rotation of the motor is changed to make the amount of defocusing $D_0$ effective; that is, the direction of rotation in which the amount of defocusing $D_0$ can be made effective, can be found out.

In the case where the value $D_0$ is ineffective although $I_T > I_{ST}$, it is determined that an object substantially zero in contrast is photographed, and therefore an auxiliary light projecting device should be used to give contrast to the object (Steps 310 and 311). Thereafter, the integration operation of the CCD sensor is started, and the calculation of the amount of defocusing $D_0$ and the determination of the effectiveness or ineffectiveness of the value $D_0$ are carried out in the same manner as described above (Steps 312 and 313). Thereafter, the remaining operations can achieved according Steps 207 through 235.

A second example of the focusing operation of the present invention in which the coefficient K is variable as the advancement position of the movable lens 53 will be described with reference to FIGS. 10(A) to 10(G) showing a flow chart thereof.

In the second embodiment, a plurality of coefficients $K_{io}$ to $K_{im}$ which are determined in correspondence with a plurality of advancement positions of a photographing lens 51, are stored in advance at addresses of the lens ROM 57 of the lens 51.

The various lens shows a variety of variations between the advancement positions thereof and the coefficients, and thus the number of coefficients is selected suitably in each of various photographying lenses.

The reading operation for reading the coefficients stored in the lens ROM 57 is carried out by such a distance code plate 61 as shown in FIG. 5.

As the movable lens 53 moves, the distance ring of the code plate 61 rotates so that the brush member provided to the ring slidably contacts with the wiring pattern $a_1$ to $a_4$ as shown in FIG. 5. With the distance code plate of FIG. 5, four different coupling condition between the brush and the wiring pattern are obtained at positions $Z_1$ and $Z_4$ to produce four output signals for addressing the lens ROM 57. The coefficient $K_i$ is read out from the address of the lens ROM 57 assigned by the output signal.

In the first example, the movement of the movable lens is controlled by detecting whether the movable lens is driven for the amount of drive P. The detection is carried out by observing the total number of pulses $P_n$ which is counted totally from the start of movement of the movable lens 53 and detecting whether the total number of pulses $P_n$ is made equal to the aimed $P_0$. On the other hand, in the second example, the detection operation is accomplished by the steps of setting the amount of drive P to a decremental counter, subtracting the number of pulses of an output signal from an encoder from the set amount, and detecting the result of subtracting becoming zero.

Figure 9:
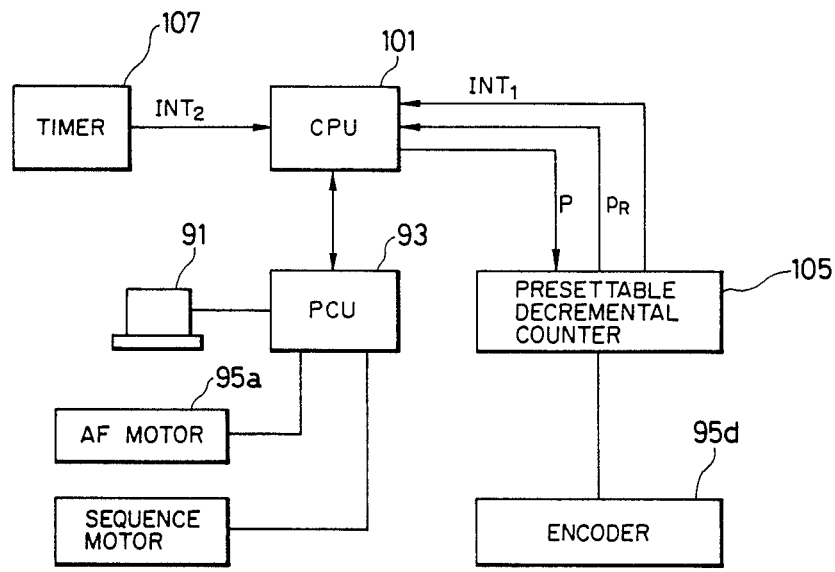

FIG. 9 is a block diagram showing an example of a device for driving the movable lens according to amount of drive P.

In FIG. 9, reference numeral 105 denotes the above-described decremental counter. As described above, set to the counter 105 is an amount of drive P for the movable lens which is obtained by the calculation in the CPU 105. The counter 105 has a sufficient capacity so as to meet with a relatively large amount of drive, which is required case of large defocusing or in case of using a lens system necessary for the large amount of drive as shown in FIG. 9, the counter 105 receives an output pulse signal from the encoder 95d. In the counter 105, the number of pulses of the output signal from the encoder 95d is subtracted from the amount of drive P thus set to apply an output signal representing the result of the subtraction to the following CPU 101. Further, the counter 105 operates to output an interruption signal $INT_1$ when the result of subtraction becomes zero. Upon reception of the interruption signal $INT_1$, the CPU 101 produces an output signal through the PCU 93 to the AF motor 95a to stop the rotation of the motor 95a, and further the CPU 101 operates to prevent an application of the signal $INT_1$ until the interruption is next allowed.

A timer 107 operates to produce an interruption signal $INT_2$ to the CPU 101 each $1 \times 10^{-3}$ sec (1 msec) for instance. When the interruption $INT_2$ is allowed, upon the reception of the interruption signal $INT_2$, the CPU 101 operates to compare the output of the counter 105 representing the remaining amount of drive $P_R$ with the reference pulse number $P_{ST}$ stored in the memory means 101a. In case of $P_R \leq P_{ST}$, the CPU 101 controls the AF motor 95a to be driven in the PWM control mode and operates to prevent the input of the interruption signal $INT_2$.

In the case where the amount of defocusing is ineffective in the first example, the operation steps 301 to 313 shown in FIG. 7 are carried out. But in the second example, in order to make the amount of defocusing D effective rapidly, the operation steps shown in FIGS. 10(E) to 10(G) are carried out.

The following is the detailed description of the second example with reference to FIGS. 6, 9, and 10(A) to 10(G). In this case, it should be noted that the amount of defocusing is obtained by the equation (1).

Figure 10A:
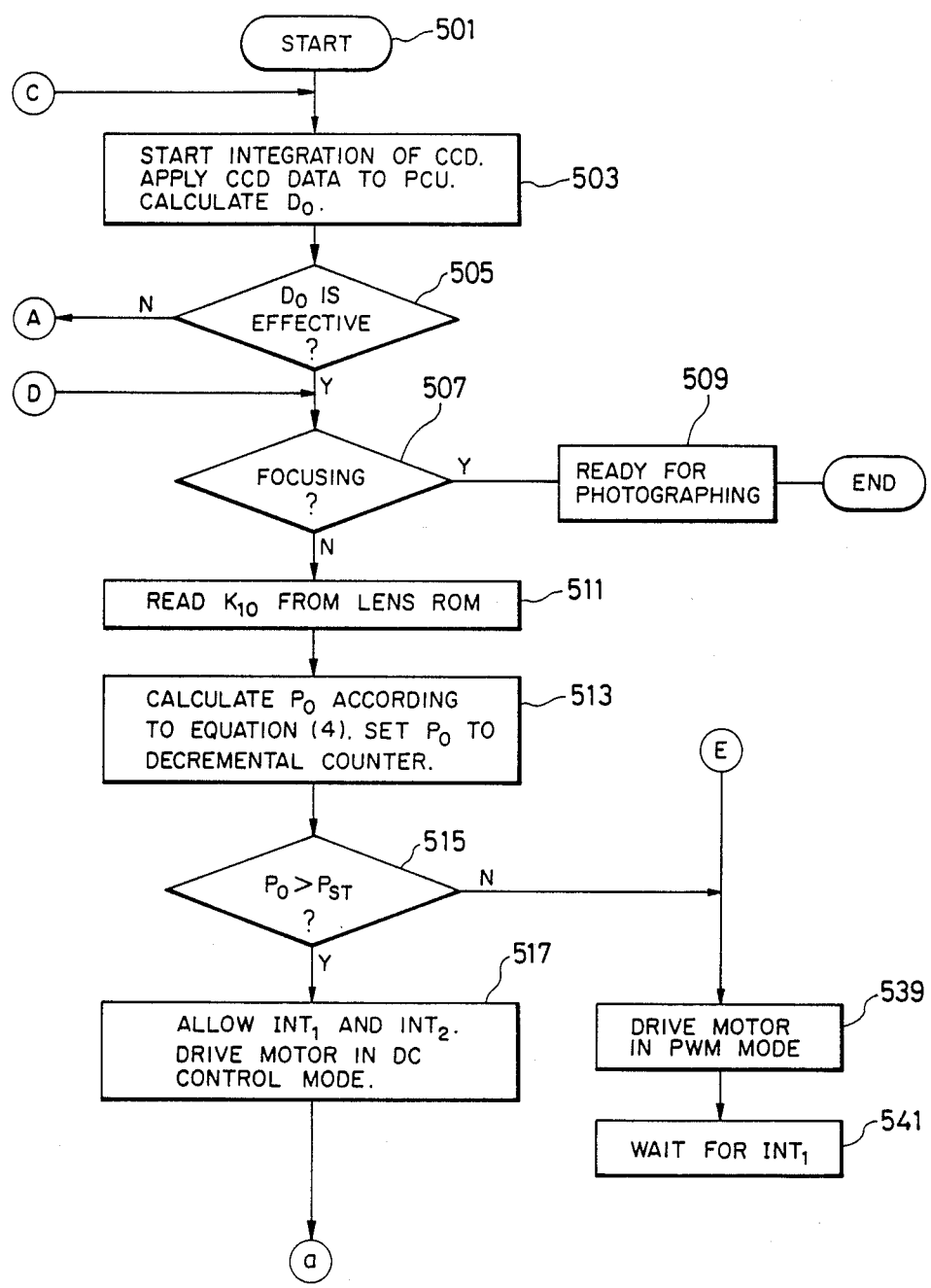
Figure 10C:
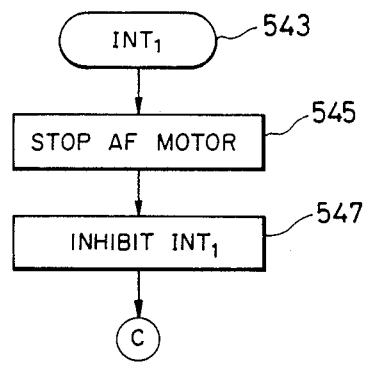

As is similar to the first example, the of the thus obtained defocusing amount $D_0$ are first carried out in this order (Steps 501 to 505 of FIG. 10(A)). In case of the defocusing amount $D_0$ being ineffective, the operation advances to the operation flow shown in FIGS. 10(E) to 10(G), which will be described in detail hereinafter.

On the other hand, when it is in the step 505 that the defocusing amount $D_0$ in effective, the operation advances to the following steps 507 where it is determined whether the focusing is obtained or not. Then, in case of the focusing being obtained, the operation advances to the steps 507 and 509 where it is informed to the photographer that the preparation of phography has been completed.

In the case where the defocusing amount $D_0$ is effective but the focusing is not obtained, lens movement coefficient $K_{1n}$ which corresponds to the present lens advancement position of the movable lens 53, is read out from the lens ROM 57. This reading-out operation is carried out by the use of the distance plate 61 as described hereinbefore. The coefficient which is referred to as $K_{10}$ is applied to the arithmetic means 101b of the CPU 101 in the step 511.

The coefficient $K_{10}$ corresponds to the coefficient $K_1$ in the equation (1). Thus, the arithmetic means 101b calculates the pulse count value $P_0$ of the signal from the encoder 95d, which represents the amount of drive from the present lens position to the focused position, according to the equation (1). In this example, the thus obtained $P_0$ is set to the presentable decremental counter 105 shown in FIG. 9 in the step 513.

As is similar to the first embodiment, the driving method of the AF motor 95a is changed, according to the focusing condition whether the defocusing amount $D_0$ is relating larger or not, as follows: First, in the according to the equation (1) is compared with a reference pulse count value $P_{St}$ stored in the memory means 101a of the CPU 101, and the result of comparison is applied to the switching means 93b of the PCU 93 (Step 515).

When $P_0 \leq P_{ST}$ in the step 515, the PCU 93 controls the AF motor 95a to be driver in the PWM control mode (step 539), and then is ready for waiting the interruption signal $INT_1$ (Step 541). Upon reception of the $INT_1$ in the step 543 of FIG. 10(C), the CPU 101 operates to output a signal to the PCU 93 so as to stop the AF motor 95a (Step 545). Then, the application of the $INT_1$ is inhibited until the interruption INT is next allowed (Step 547). Subsequently, the operation is returned to the step 503 of FIG. 10(A).

On the other hand, when $P_0 > P_{ST}$ in the step 515, the CPU 101 operates to allow both the interruptions $INT_1$ and $INT_2$. The PCU 93 controls the AF motor 95a in the DC control mode so that the motor 95a is driven at a constant high speed (Step 517). In this case, because of both $INT_1$ and $INT_2$ being allowed, even in the motor driving operation in the DC control mode, when the CPU receives the $INT_1$, the operation is allowed to advance to the steps 543 to 547 shown in FIG. 10(C), and then returned to the step 503. Further, the remaining amount of drive for the AF motor 95a, which is produced by the decremental counter 105, is composed with the reference pulse value $P_{ST}$ each 1 msec for instance (Steps 549 and 551).

Figure 10D:
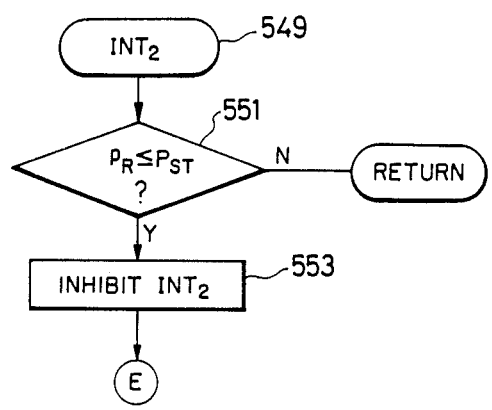
Figure 10E:
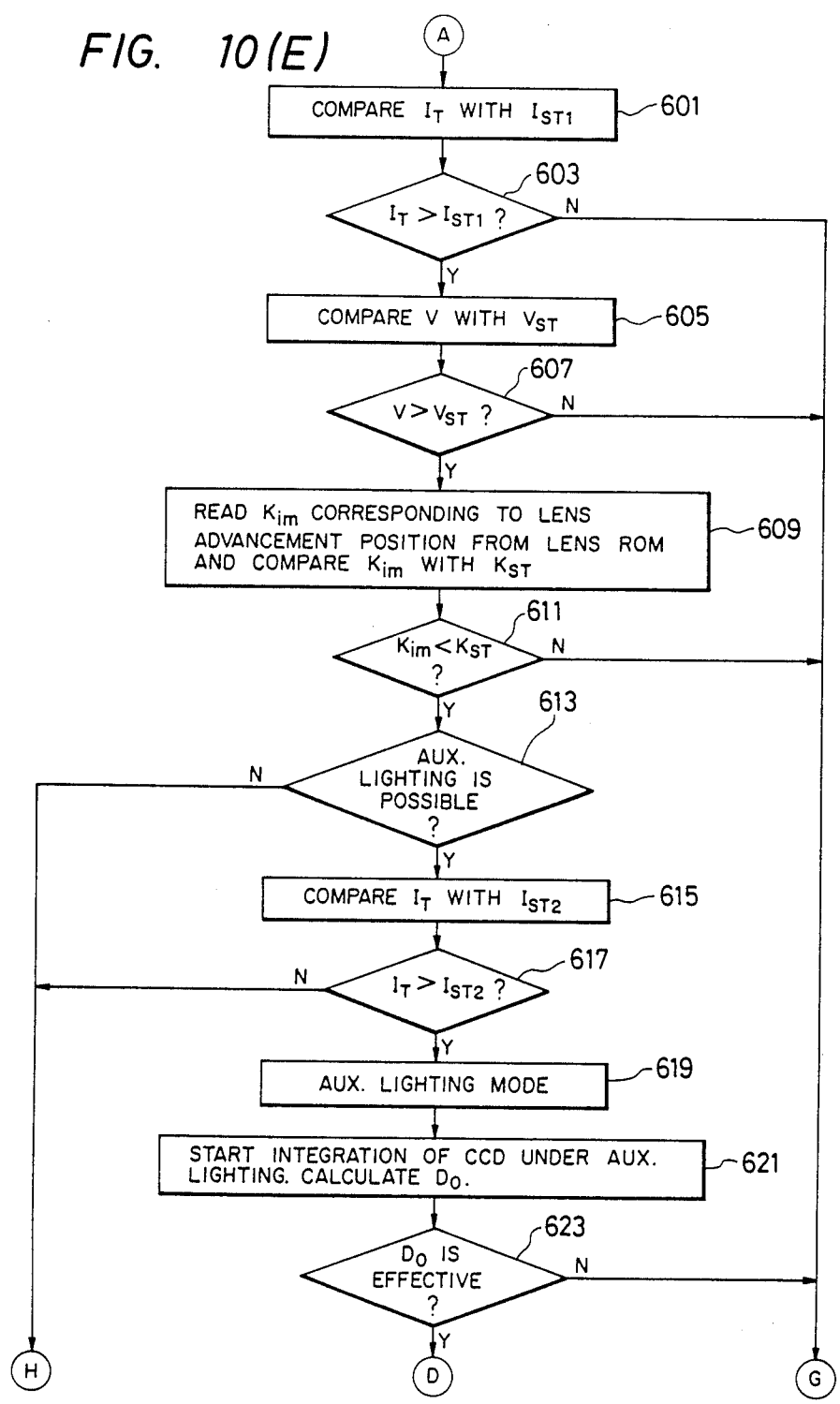
Figures 10F, 10G:
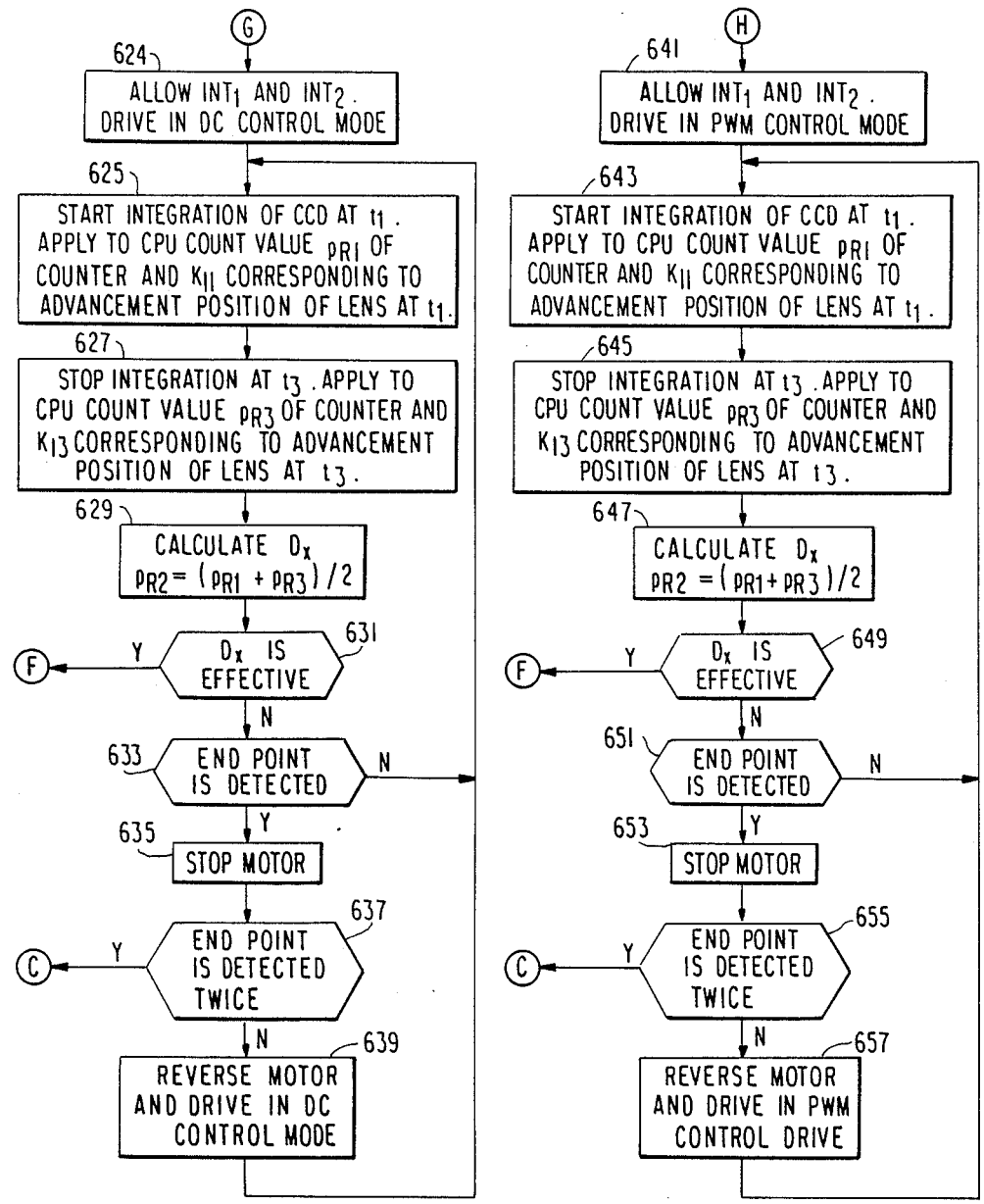

As shown in FIG. 10(D), when $P_R \leq P_0$ in the step 551, the interruption $INT_2$ is prevented (Step 553), and then the operation is returned to the step 539 of FIG. 10(A).

The AF motor 95a is driven in the above-described manner. Therefore, when the amount of defocusing $D_0$ is relatively small, the lens can be delicately moved. Thus, the automatic focusing operation is excellent both in accuracy and in efficiency.

Figure 11:
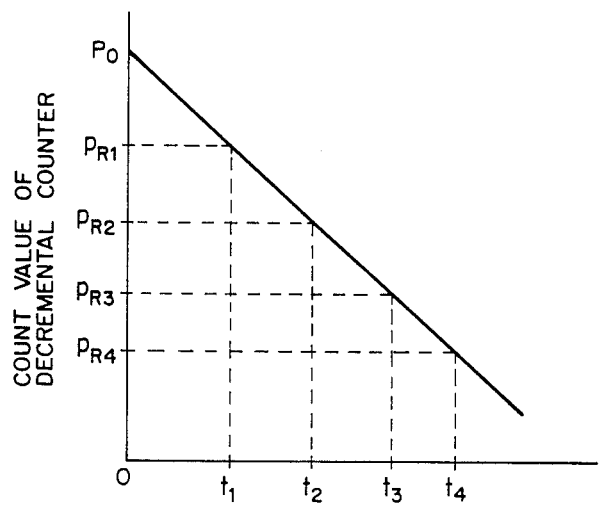

While the AF motor 95a is driven in the DC control mode, the movable lens 53 is moved towards the focusing position at a constant-speed. In the constant-speed movement of the movable lens, an operation for obtaining a new amount of drive $P_z$ for controlling the motor 95a to move the lens 53 to the focused position is continuously carried out. FIG. 11 is an explanatory diagram for a description as to the principle of obtaining the new amount of drive $P_z$, which corresponds to FIG. 3. In FIG. 11, the vertical axis indicates an output of the decremental counter 105.

First, as shown in FIG. 10(B) at a time instant $t_1$ during the constant-speed movement of the movable lens 53, the integration operation of the CCD sensor of the image pickup section 91 is started. The pulse count value $p_{R1}$ Of the decremental counter 105 at the time instant $t_1$ and coefficient $K_{11}$ corresponding to the advancement position of the movable lens at the time instant $t_1$ are applied to the memory means 101a of the CPU 101 (step 519). At a time instant $t_3$ after the lapse of a period of time long enough to allow the CCD sensor to receive a predetermined quantity of light, the integration operation of the CCD sensor is suspended. For the period of time $(t_3 - t_1)$; the movable lens is being moved, and therefore the pulse count value of the counter 105 is decreased to $p_{R3}$ from $p_{R1}$. The value $P_{R3}$ and coefficient $K_{13}$ corresponding to the advancement position at the time instant $t_3$ are is inputted to the memory means 101a of the CPU 101. In addition, the data provided by the CCD sensor for the period of time $(t_3 - t_1)$ is applied to the PCU 93 (step 521).

Similarly as in the calculation of the amount of defocusing in the step 503, an amount of defocusing $D_x$ is calculated according to the data provided by the image pickup section 91 for the period of time $(t_3-t_1)$. The value $D_x$ thus calculated may be regarded as an amount of defocusing at the middle of the period of time $(t_3-t_1)$; i.e., at a time instant $t_2$. In the arithmetic means 101b, the pulse count value $P_{R2}$ at the time instant $t_2$ is Calculated from the following equation (step 523):

$$p_{R2}=(p_{R1}+p_{R3})/2$$

In the following step, it is determined in the same manner in the step 505 whether the defocusing amount $D_x$ which is obtained in the step 525 is effective or not. In case of being ineffective, the operation is returned to the step 519.

In case of being effective, the comparison of $K_{11}$ and $K_{13}$ is carried out in the comparison means 101c of the CPU 101 in the step 527. As a result, in case of $K_{11}>K_{13}$, the coefficient $K_{13}$ is used as $K_1$ in the step 529. On the other hand, in case of $K_{11} \leq K_{13}$, the coefficient $K_{11}$ is used as $K_1$ in the step 531. By selecting the smaller coefficient $K_1$, an occurrence of overrun of the movable lens is avoided.

In the arithmetic means 101b, the value $D_x$ is used to obtain the number of pulses $P_x$ to move the lens 53 from its position at the time instant $t_2$ to the focused position according to equation (1) described above (step 533).

On the other hand, the movable lens is moved on and thus the count value of the decrement counter 105 is decreased, even while the values $D_x$, $p_{R2}$ and $P_x$ is being calculated. Therefore, at the time instant $t_4$ when the value $P_x$ has been calculated, the count value of the decrement counter 105 has been increased to $p_{R4}$ from $p_{R3}$. the value $p_{R4}$ is applied to the memory means 101a to be stored therein (step 535).

Thereafter, based on the values $P_x$, $p_{R2}$ and $p_{R4}$, is Operated to obtain the number of pulses $P_z$ required for moving the movable lens 53 from its position at the time instant $t_4$ to the focused position according to the following equation (6) (step 537):

$$P_z=P_x-(p_{R2}-p_{R4}) \quad (6)$$

After the new amount of drive $P_z$ is newly set to the decrement counter 105 in the step 537, the operation is returned to the step 519. Then, the operations in the steps 519 to 537 are carried out repeatedly. This operation in the steps 519 to 537 are carried out cyclically. During this cyclical operations of the steps 519 to 537, if either the interruption signal $INT_1$ or $INT_2$ is received by the CPU 101, the operation skips to either the step 543 shown in FIG. 10(C) or the step 549 shown in FIG. 10(D).

Due to the new amount of drive $P_z$, the accuracy is focusing is improved when compared with the accuracy in focusing based on the prior amount of drive $P_0$. Further, due to the provision of the steps 527 to 531, it is possible to present such an occurrence of undesired overrunning that the movable lens 53 overruns the focused position from either front-defocused position or rear-defocused position. In other words, it is possible to avoid undesired focusing operation such that the movable lens 53 is positioned at the focused position after, the reciprocating movement thereof which makes the photographer uncomfortable.

Although one of the coefficients $K_{11}$ and $K_{13}$, that is smaller than the other, is employed as a coefficient $K_1$ in the second embodiment, in case of using a lens system whose coefficient K is variable, modifications are possible without departing from this concept.

For example, assuming that the integration period of the CCD sensor is extremely short, the variation in the coefficient during this short period can be approximated linearly and the coefficient $K_{13}$ at the time instant $t_3$ is smaller than the other, a lens movement conversion coefficient $K_{im}$ may be determined as $K_{im}=(K_{11}+K_{13})/2$. In this case, it goes without saying that the focusing accuracy is statisfactory.

Next, in the case where an object having substantially no contrast is photographed or the movable lens 53 is extremely apart from the focused position (the image being greatly foggy), the amount of defocusing $D_0$ is determined ineffective in the step 505. Then, the operation advances to the step 601 shown in FIG. 10(E). The following operations will be described with reference to FIGS. 10(E) to 10(G).

In this case, the comparison means 101c of the CPU outputs a signal representing the ineffectiveness of the amount of defocusing to the integration time comparison means 93a of the PCU. In response to the signal, the integration time $I_T$ of the CCD sensor is compared with a reference integration time $I_{ST1}$ read out from the memory means 101a in the comparison means 93a (steps 601 and 603). When in the step, 603, it is determined that $I_T>T_{ST1}$, then a power source voltage V for driving the AF motor 95a is compared with a reference voltage value $V_{ST}$ which has been stored in the memory means 101a (steps 605, 607). This comparison is accomplished in view of the following reason. Assuming that the movable lens 53 is driven at a high speed in the DC control mode under the power source voltage V is relatively high, there may occur overrunning of the movable lens 53 during the image of the object being formed on the CCD sensor 91. This disadvantage can be avoided by controlling the drive of the AF motor 95 taking the result of the voltage comparison into consideration.

In case of $V>V_{ST}$ and using a lens system whose lens movement conversion coefficient is made unchanged with respect to the advancement position of the movable lens, the constant coefficient $K_{im}$ is read out from the lens ROM 57 to be applied to the CPU 101 (step 609). The coefficient $K_{im}$ is compared with a reference coefficient $K_{ST}$ which has been stored in the memory means 101a (step 611).

Since the coefficient K represents the number of pulses per unit movement value of the image formed by the movable lens, in case of the coefficient $K_{im}$ being relatively small, it is likely to move the movable lens roughly. This may result in focusing with insufficient accuracy. In this case, it should be noted that, assuming that the coefficient K is defined by $1/K_{im}$, the large and small relation of the K value is inverted. This comparison is also carried out to improve the accuracy of focusing.

In the case where it is detected in the step 611 the coefficient $K_{im}$ is smaller than the reference coefficient $K_{ST}$, it is confirmed whether an auxiliary light projecting device can be used or not (step 613). The auxiliary light projecting device produces a pattern light beam such as a zebra pattern bean. If yes, the operation advances to the step 615 where the integration time $I_T$ is compared, in the comparison means 101c, with a different reference integration period of time $I_{ST2}$ which is set longer than the prior $I_{ST1}$ and then stored in the memory means 101a in advance. This is carried out in order to detect brightness of the object.

In case of the $I_T$ is longer than the $I_{ST2}$, the focusing operation is carried out in the auxiliary light projecting operation mode (steps 617 and 619). Then, under the lighting of the auxiliary light projecting device, the light reflected from the object is integrated to obtain the amount of defocusing $D_0$ (step 621). In the following step 623, the thus obtained defocusing amount $D_0$ is subjected to examination whether it is effective or not. In case of being effective, the operation is returned to the step 507 shown in FIG. 10(A).

On the other hand, in case of the defocusing amount $D_0$ being determined ineffective in the step 623, as is similar to the case where "No" is issued in the step 603, 607 or 611, the operation advances to a routine shown in FIG. 10(F).

In the step 624, the CPU 101 operates to allow both the interruptions $INT_1$ and $INT_2$, and further outputs an instruction signal sr, as to drive the AF motor 95a in the DC control mode. This DC control mode operation is carried out in the same manner as in the steps 519 to 523 shown in FIG. 10(B) to obtain the amount of defocusing $D_0$ during the AF motor 95a being driven (steps 624 to 629). Subsequently, in the step 631, it is determined in the same manner as in the step 505 whether the thus obtained defocusing amount $D_0$ is effective or not. In case of effective, the operation is returned to the step 527.

In case of ineffective, it is detected whether the a movable lens has arrived at an end point in one movement direction thereof in the following step 633. When the movable lens has not yet reached the end point and can be further advanced (or retracted), the operation is returned to the step 625.

On the other hand, upon detection of reaching the end point, the AF motor 95a is stopped in the step 635.

Then, it is confirmed whether the detection of the end point is the first time or not in the step 637. In case of the first time, the rotation of the AF motor 95a is reversed and the AF motor 95a is driven in the DC control mode in the step 639. Subsequently, the operation is returned to the step 625. On the other hand, in case of twice, the operation is returned to the initial step 503.

In the case where it is detected in the step 613 that the auxiliary light projecting device cannot be used or it is detected in the step 617 that $I_T \leq I_{ST2}$, the CPU 101 operates to allow both interruptions $INT_1$ and $INT_2$ and also operates to output an instruction signal to the PCU 93 so as to control the AF motor 95a in the PWM control mode (step 641 shown in FIG. 10(G)). This PWM control operation is carried out in the same manner as in the steps 519 to 523 in the steps 643 to 647. In the step 647, the new amount of defocusing $D_0$ is obtained. The new defocusing amount $D_0$ is subjected to the evaluation in the step 649, and then in case of effective, the operation is returned to the step 527 shown in FIG. 10(B).

In case of ineffective, it is confirmed whether the movable lens 53 has arrived at an end in one movement direction thereof (step 651). If no that is, if the movable lens 53 has not yet reach the end point and can be further advanced (or retracted), the operation is returned to the step 643. On the other hand, if yes, the AF motor 95a is stopped in the step 653. Then, it is confirmed in the step 655 whether the detection of the end point is the first time or not. In case of the first time, the rotation of the AF motor 95a is reversed and the AF motor 95a is driven in the PWM control mode (step 657). Thereafter, the operation is returned to the step 643. In case of twice, the operation is returned to the initial step 503.

In the above described focusing operation shown in FIGS. 10(E) to 10(G) the driving condition of the AF motor 95a for eliminating the ineffectiveness of the defocusing amount $D_0$ is taken into account, and therefore it is accelerated to make the defocusing amount $D_0$ effective The following is a description as to an automatic focusing operation for an apparatus using a lens system whose lens movement conversion coefficient K is variable, and in which the amount of drive P is calculated according to the equation (4).

In this case, a plurality of coefficient pairs each including primary and secondary ones $K_{1m}$ and $K_{2m}$ which correspond to various advancement position of the movable lens 53, respectively, are stored in the lens ROM 57 in advance. The coefficient pair which is stored in an address corresponding to the present lens advancement position of the lens ROM 57 is read out to calculate the amount of drive P according to the equation (4). The automatic focusing operation is substantially same as that of FIGS. 10(A) to 10(G) other than the steps 511 to 533 shown in FIGS. 10(A) and 10(B). Therefore, the different portion of the operation flow will be described with reference to FIG. 12 where the same steps as those in FIGS. 10(A) and 10(B) bear the same reference numerals.

In case of "No" in the step 507, the operation advances to the step 701 where a pair of $K_{1m}$ and $K_{2m}$ which correspond to the present lens advancement position are read out from the lens ROM 57 to the CPU 101. The coefficients $K_{1m}$ and $K_{2m}$ being referred to as $K_{10}$ and $K_{20}$. In the step 703, the CPU 101 calculates the amount of drive $P_0$ according to the equation (4) based on the coefficients $K_{10}$ and $K_{20}$ and the defocusing amount $D_0$ which is obtained in the step 503. The thus obtained $P_0$ is then set to the decremental counter 105 (step 703).

In the following step 705, the comparison means 101c compares the drive amount $P_0$ with the reference pulse count value $P_{ST}$ which is stored in the memory means 101a of the CPU 101 is advance. In case of $P_0 \leq P_{ST}$, the AF motor 95a is driven in the PWM control mode, and the CPU 101 waits receiving the interruption signal $INT_1$ (Steps 731 and 733). After reception of the interruption signal $INT_1$, the operation advances to the operation flow shown in FIG. 10(C).

In Case of $P_0 > P_{ST}$ in the step 705, the CPU 101 allows both interruptions $INT_1$ and $INT_2$, and operates to an instruction signal to the PCU 93 so that the AF motor 95a is driven in the DC control mode (step 707). Because of the $INT_1$ and $INT_2$ being allowed, the CPU 101 skips the operation to the operation flow shown in FIG. 10(C) upon reception of the $INT_1$. Further upon reception of the $INT_2$, the count value $P_R$ of the decremental counter 105 is compared with the reference count value $P_{ST}$ every one second (step 551). When $p_R \leq P_{ST}$, the CPU 101 outputs an instruction signal to the PCU 93 so as to drive the AF motor 95a in the PWM control mode (step 539).

After the step 707, the integration of the CCD sensor is started at the time instant $t_1$ during the movable lens being driven at the constant speed. The count value $P_{R1}$ of the counter 105 at the time instant $t_1$ and the coefficients $K_{11}$ and $K_{21}$ corresponding to the advancement position of the movable lens at the time instant $t_1$ are input to the memory means 101a of CPU 101 (step 709). Thereafter, at the time instant $t_3$ after a certain period of time has elapsed, which is necessary that the CCD sensor can receive the sufficient amount of light, the integration operation of the CCD sensor is suspended. Since the movable lens 53 moves continously during period of time $(t_3-t_1)$, the count value of the counter 105 also decreases from $p_{R1}$ to $p_{R3}$ and the lens position is also changed. The count value $p_{R3}$ of the counter 105 at the time instant $t_3$ and the coefficients $K_{13}$ and $K_{23}$ corresponding to the advancement position of the movable lens at the time instant $t_3$ are written to the memory means 101a of the CPU 101. Further, the data obtained by the CCD sensor during the period of time $(t_3-t_1)$ is applied to the PCU 93 (step 711).

Next, the defocusing amount $D_x$ is calculated based on the data of the CCD sensor in the PCU 93. The defocusing amount $D_x$ is equivalent to that at the middle point $t_2$ of the period $(t_3-t_1)$. The arithmetic means 101b calculates the count value $p_{R2}$ from the equation $p_{R2}=(p_{R1}+p_{R3})/2$ (step 713).

In the following step 715, it is determined in the same manner as that in the step 505 whether the defocusing amount $D_x$ obtained in the step 713 is effective or not. In case of ineffective, the operation is returned to the step 709.

On the other hand, in case of effective, the CPU 101 calculates the amount of drive $P_{X1}$ based on the defocusing amount $D_x$ and the coefficients $K_{11}$ and $K_{21}$ corresponding to the lens advancement position at the time instant $t_1$ according to the equation (4). In addition, the CPU 101 calculates the amount of drive $P_{X3}$ based on the defocusing amount $D_x$ and the coefficients $K_{13}$ and $K_{23}$ corresponding to the lens advancement position at the time instant $t_3$ according to the equation (4) (step 717). Subsequently, the comparison means 101c of the CPU 101 compares the thus obtained $P_{X1}$ and $P_{X3}$, as a result of which the smaller one is employed as the amount of drive $P_x$ (steps 719 to 723). After the step 723, the operation is returned to the step 535 shown in FIG. 10(B).

As is apparent from the above, in the above described embodiment, the amount of drive $P_z$ is obtained according to the equation (4) including the primary and secondary coefficients, and therefore the movable lens 53 can be positioned closer to a real focused position when compared with the embodiments using the equation (1) including the primary coefficient only. Further, this embodiment has the same advantage as those in the other embodiment described above that the focusing is obtained without reciprocating movement of the movable lens with respect to the focused position. This results in eliminating uncomfortable feeling to the photographer during the focusing operation.

Figure 12:
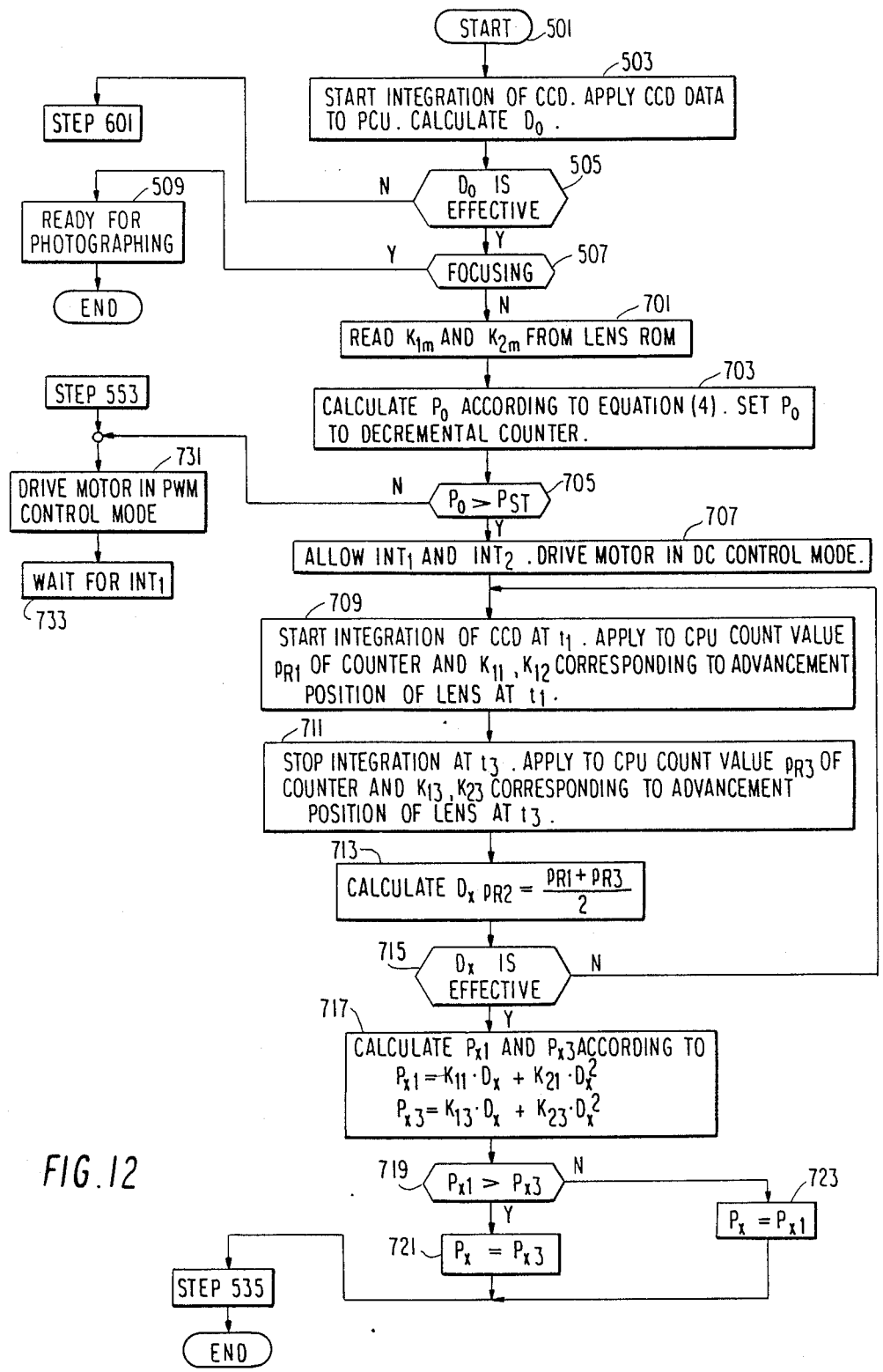

In the embodiment described with reference to FIG. 12, assuming that the integration period of tim of the CCD sensor is extremely short, the coefficient shows almost linear variation during such an integration period of time and the amount of drive $P_{X3}$ at the time instant $t_3$ is smaller than that of $p_{X1}$, $(P_{X1}+P_{X3})/2$ may be used as the amount of drive $P_x$ for calculation of the drive amount.

Further, there is a lens system whose secondary coefficient $K_{2m}$ equation (4) is made substantially unchanged regardless of the lens advancement position. In this case, a certain constant value may be used as a common secondary coefficient $K_2$.

Modifications are possible without departing from the scope of the present invention. More specifically, in case of using a zoom lens system, plural sets of coefficients which correspond to a variety of the lens positions may be stored in a plurality of lens ROMs, respectively, for various zooming positions. The addressing operation for the lens ROMs may be carried out by using a code plate similar to the distance plate described above, which varies its code in response to the rotation movement of a zooming ring of the lens system.

What is claimed is:

1. An automatic focusing device comprising:
   a lens system including a focusing lens;
   means for driving said focusing lens;
   a first means for calculating a first amount of defocusing for an object; and
   a second means for calculating an amount of drive for moving said focusing lens to a position focused to said object based on the amount of defocusing,
   said second means being capable of renewing the amount of drive based on a second amount of defocusing that is obtained by said first means during said focusing lens moving to the focused position, and said focusing lens being driven to the focused position according to the renewed amount of drive after the renewing thereof.

2. The device as defined in claim 1 wherein said second means calculates the amount of drive P according to $$P = \sum_{i=1}^{n} K_i \cdot D^i$$

where K is lens movement conversion coefficient and D is the amount of defocusing.

3. The device as defined in claim 2 wherein the coefficient K is a constant which has been stored in a lens ROM of said lens system.

4. The device as defined in claim 2 wherein the coefficient is variable according to lens advancement position of said focusing lens, the renewing of the drive amount being carried out based on another coefficient corresponding to the present advancement position of said focusing leans and the variable coefficients K being stored in a lens ROM of said lens system in advance.

5. The device as defined in claim 1 further comprising means for controlling said driving means in response to variation in brightness of the object.

6. An automatic focusing device, comprising:
   a lens system including a focusing system;
   means for driving said focusing system;
   first means for calculating a first amount of defocusing D for an object;
   second means for calculating an amount of drive P for moving said focusing lens to a position focused on said object based on the amount of defocusing according to $$P = K_1 D + K_2 D^2$$

where $K_1$ and $K_2$ are lens movement conversion coefficients, said second means being capable of renewing the amount of drive based on a second amount of defocusing that is obtained by said first means during said focusing lens moving to the focused position, and said focusing lens being driven to the focused position according to the renewed amount of drive.

7. The automatic focusing device of claim 6, wherein the coefficients $K_1$ and $K_2$ are constants which have been stored in a lens ROM of said lens system.

8. The automatic focusing device of claim 6, wherein the coefficient $K_1$ is variable according to lens advancement position of said focusing lens, the renewing of the drive amount being carried out based on the lesser of the previous $K_1$ coefficient and another $K_1$ coefficient corresponding to the present advancement position of said focusing lens and the variable coefficients $K_1$ being stored in a lens ROM of said lens in advance.

9. The automatic focusing device of claim 6, wherein the coefficient $K_1$ is variable according to lens advancement position of said focusing lens, the renewing of the drive amount being carried out based on the average of the previous $K_1$ coefficient and another $K_1$ coefficient corresponding to the present advancement position of said focusing lens and the variable coefficients $K_1$ being stored in a lens ROM of said lens in advance.

10. The automatic focusing device of claim 6, further comprising:

means for determining whether said defocusing amount is ineffective in that the object to be photographed has a predetermined amount of contrast and for determining whether said first amount of defocusing is greater than a predetermined value;

means for determining the integration time required for said second means to renew the amount of drive;

means for comparing said integration time with a first reference time;

means for comparing a power source voltage for driving said driving means with a reference voltage;

means for comparing the coefficient $K_1$ corresponding to the present advancement position of said focusing lens with a reference coefficient;

means for determining whether auxiliary light is available;

means for comparing said integration time with a second reference time which is longer than said first reference time, wherein if it is determined that said defocusing amount is ineffective, that said power source voltage is greater than said reference voltage, that said coefficient $K_1$ is less than said reference coefficient, that said auxiliary light is available and that said integration time is greater than said second reference time, said first means calculates the amount of defocusing using the auxiliary light.

11. The automatic focusing device of claim 10, wherein the coefficient $K_1$ represents the number of pulses per unit movement value of the image formed by the movable lens.

12. The automatic focusing device of claim 6, further comprising means for comparing said renewed amount of drive with the previous amount of drive, the smaller one being the amount that said focusing lens is moved by said driving means.

13. The automatic focusing device of claim 6, wherein the amount that said lens is driven by said driving means is the average driving amount of the renewed driving amount and the previous driving amount.

* * * * *